Nov. 25, 1969   R. L. HOUSER   3,480,149
FLAT CASING FILTER DEVICE
Filed March 8, 1967   2 Sheets-Sheet 1
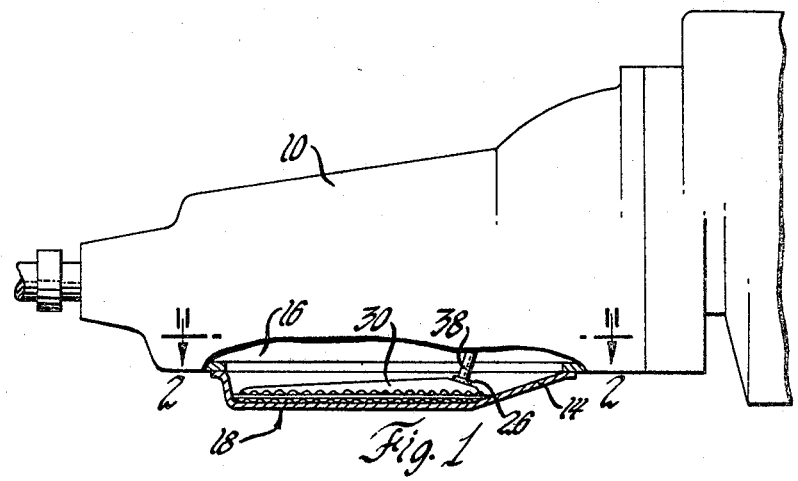
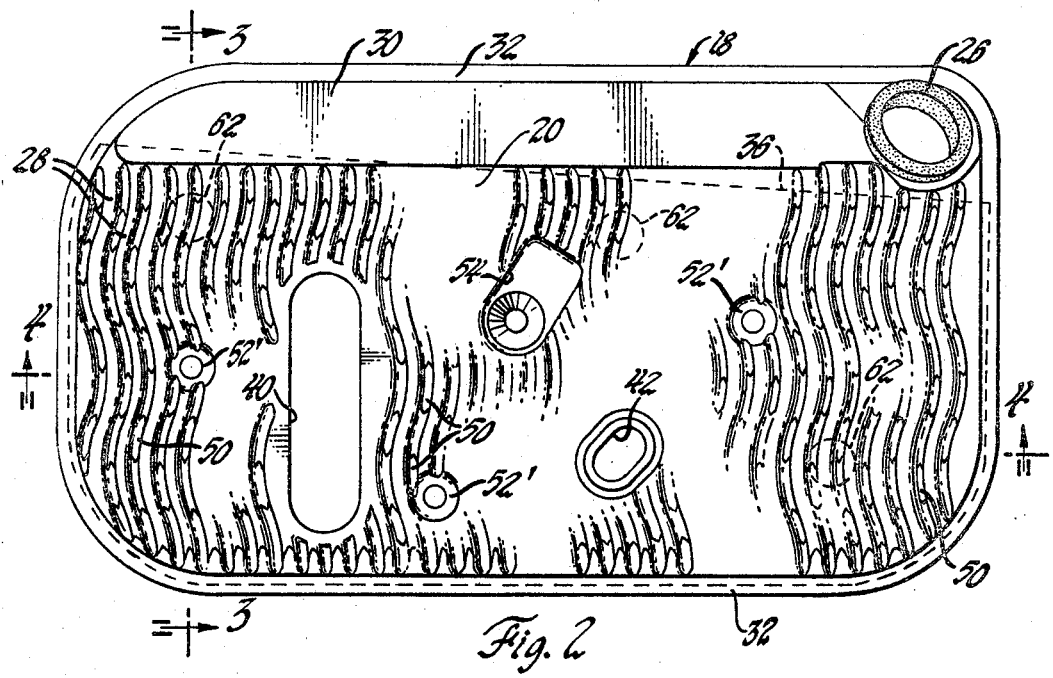
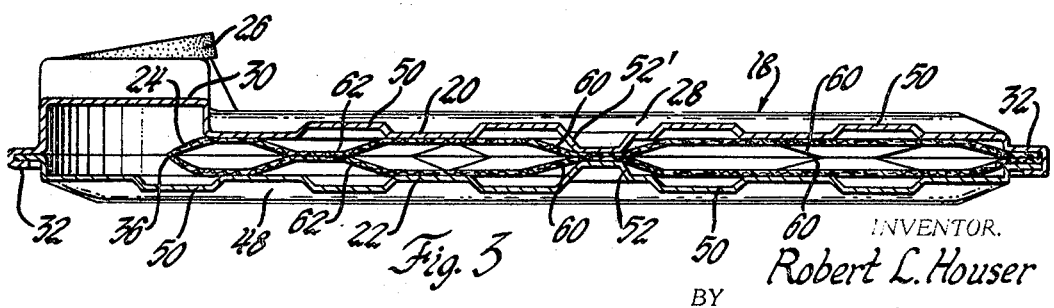
INVENTOR.
Robert L. Houser
BY
George E. Johnson
ATTORNEY Nov. 25, 1969  R. L. HOUSER  3,480,149
FLAT CASING FILTER DEVICE
Filed March 8, 1967  2 Sheets-Sheet 2
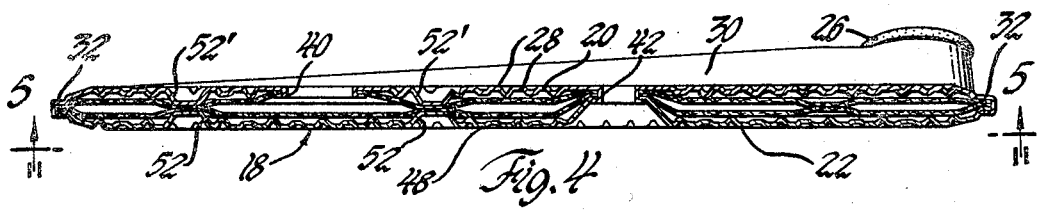
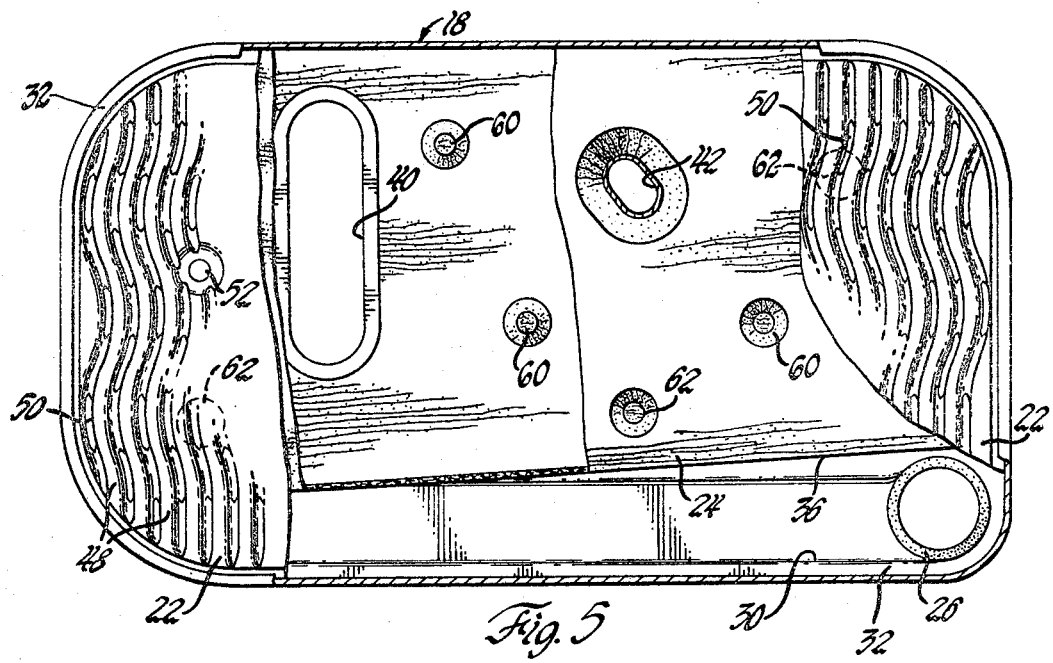
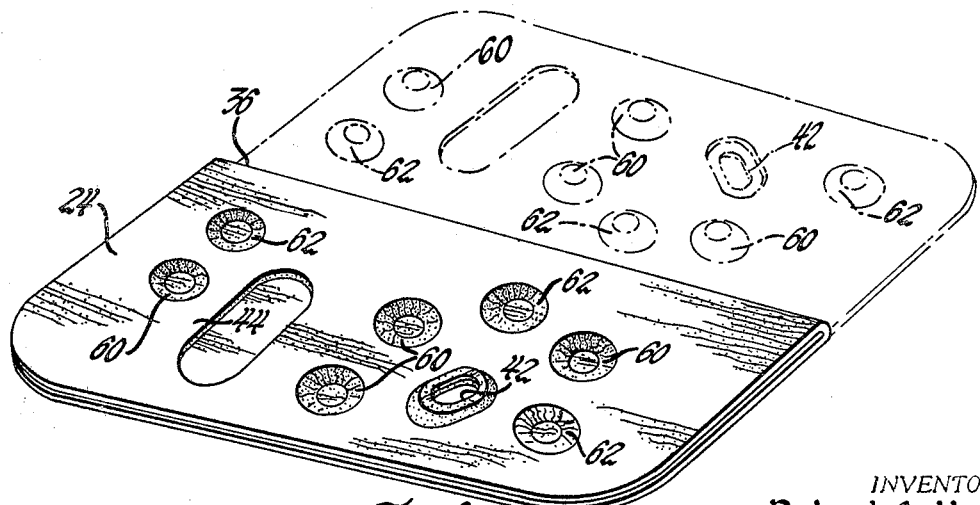
INVENTOR.
Robert L. Houser
BY George E. Johnson
ATTORNEY

United States Patent Office 3,480,149
Patented Nov. 25, 1969

3,480,149
FLAT CASING FILTER DEVICE
Robert L. Houser, Flint, Mich., assignor to General Motors Corporation, Detroit, Mich., a corporation of Delaware
Filed Mar. 8, 1967, Ser. No. 621,589
Int. Cl. B01d 27/08
U.S. Cl. 210—445                    1 Claim

ABSTRACT OF THE DISCLOSURE

A flat casing closely confining a flat envelope of filter material, the casing and filter material being cooperatively arranged to maintain liquid flow passages leading to and from the filter material.

---

This invention pertains to a compactly encased filtering device in which liquid to be clarified is pulled by pump action through a closely held sheet of filter material of suitable porosity and strength selectively to remove foreign matter from that liquid.

An oil filtering device for use in a transmission casing of an automobile or for some similar use in which the filter device is compact and also conformable to a housing wall is disclosed in U.S. Patent No. 3,371,793, issued Mar. 5, 1968. While satisfactory, such a device has been found to be restrictive to fluid flow under conditions when an elevated differential pressure would cause the top and bottom sheets or plates to momentarily come together. The discharge of fluid through the envelope surface would therefore not be as uniform as desired.

This invention is an improvement over the filter device disclosed in the above referenced patent and the object is to provide a liquid filter device characterized by novel aspects assuring maintenance of flow passages through the device despite the application of elevated differential pressure and close proximity of the casing and filter material walls in a compact device.

In the drawings:

FIGURE 1 is a side elevation of a transmission casing as used in an automobile, a portion being broken away to show a mode of installation of a filter device constructing one embodiment of this invention;

FIGURE 2 is an enlarged plan view of the filter device as seen looking in the direction of the arrows 2—2 in FIGURE 1;

FIGURE 3 is a further enlarged sectional view taken along the line 3—3 in FIGURE 2;

FIGURE 4 is a sectional view looking in the direction of the arrows 4—4 in FIGURE 2;

FIGURE 5 is a view looking upwardly or in the direction of the arrows 5—5 in FIGURE 4 with sections being cut away to illustrate the construction; and FIGURE 6 is a perspective view of an envelope of filter material used in the device of FIGURES 1 to 5, a portion being shown in dot and dash lines as positioned prior to folding.

An automotive transmission housing 10 is provided with a bottom plate 14 to close a space 16 so filled with conventional gearing, etc. (not shown), as to necessitate a maximum of compactness for an oil filter device 18 closely conforming to the plate or wall 14. The latter is dished to serve as a shallow reservoir of oil in which the device 18 is immersed.

The device 18 comprises four parts: A top sheet 20, a bottom sheet 22, an envelope 24 of filter material in single sheet form and a rubber grommet 26. The top and bottom sheets or plates 20 and 22 are each of impermeable, relatively rigid, and uniform thickness material such as sheet steel.

The top sheet 20 has corrugations or ridges 28 extending from a tapered manifold 30 placed along one side of the filter device. They are undulating and extend to a portion of flat marginal area 32 at the opposite side. The area 32 surrounds the undulated area as well as the manifold 30 and is crimped over tightly to hold the perimeter of the bottom metal sheet 22 and three sides of the envelope 24. The fourth side 36 is a fold and is beneath and at a slight angle with respect to one side of the manifold 30 as seen in FIGURES 2 and 5. The rubber grommet 26 is adapted to form an outlet connection with an oil pump inlet or suction pipe 38 (FIGURE 1). The taper of the manifold 30 not only distributes suction effect on the envelope 24 but also aids in the discharge of any trapped air. The top plate 20 bears two apertures 40 and 42 within its corrugated area. The aperture 40 is elongated and the metal margin thereof is bent in reverse tightly to hold the peripheral margin 44 (FIGURE 6) of a corresponding aperture in the top layer of the envelope 24. The aperture 42 goes entirely through the device 18 with the top and bottom metal plates 20 and 22 crimped together and both layers of the envelope filter material held tightly (FIGURE 4) to form a single pocket for trapping foreign matter. The aperture 42 is not essential for the filtering function but is used for receiving a through-bolt to locate the device.

Corrugations or ridges 48, conforming somewhat to the corrugations 28 in the top plate 20, are formed in the bottom plate 22. They undulate in substantially the same pattern but are longer as they extend beneath the manifold 30. In U.S. Patent 3,371,793 previously referred to corrugations are disclosed but in the present instance the outside valleys between the adjacent corrugations or ridges of each plate are characterized by spaced outwardly raised portions or bumps 50 most clearly shown in FIGURE 3.

Four spaced and circular indentations determine inner knobs 52 in the bottom plate 22 and three of these are opposed by corresponding knobs 52' in the top plate 20. The fourth is opposed by a shallow and knob form indentation 54 in the top plate. The shallow portion is of no functional merit insofar as filtering is concerned but is necessary for clearance of structure in the transmission casing 10 and is illustrative of modifications that are permissible to suit conditions presenting restrictions of available space without disrupting or unduly interfering with the filter device operation.

Conforming with the knobs 52 and 52' are dimples 60 made in the walls of the folded paper envelope 24 to provide recesses for those knobs to rest in. Added dimples 62 in the envelope material are placed in areas where support of the paper is needed. These dimples 60 and 62 maintain the space between the walls of the filter envelope for uniform distribution of the liquid flow and maximum utilization of pump suction.

The filter material or paper of the envelope 24 is of resin impregnated porous structure conventionally cured and having fibers predominantly extending in one direction—i.e., along the grain of the paper—and the fold 36 is made parallel with the grain. This minimizes the possibility of rupture at the fold. The single sheet of paper used is preferably of a rough surface on both sides but it need not be corrugated.

Oil flows from the housing 10 into the inlet slot or aperture 40 and fore and aft movement of the vehicle will not cause ingress of air as would take place if the aperture were round and as adequate in size. Acceleration or braking would often cause ingestion of air if the aperture were round and of such size so that the oil would not cover the aperture due to sloshing of the oil during braking or acceleration, and this could cause loss of pump prime which would have adverse effects on the transmission. It is understood, of course, that in any given application and depending on the size of the transmission and the capacity of the transmission that a filter having a round aperture could be used, the requirement being that the aperture be sized and arranged so it will not be uncovered as the oil is sloshed in the transmission during acceleration and braking. The dimples in the filter paper plus the roughness of the latter causes distribution of the oil within the envelope 24. The oil then flows through the walls of the latter and its flow to the manifold 30 is facilitated by the dimples and corrugations in the metal plates 20 and 22 as well as by the spaced raised portions or bumps 50. Flow of oil between these bumps and transverse to the undulating metal corrugations assures maximum and uniform flow of oil from the exterior surfaces of the envelope 24 to the manifold 30 and the taper of the latter minimizes air entrapment, and provides for gradual dissipation of any air entrapped, permitting normal pump and transmission operation.

I claim:
1. A filter device comprising a fibrous, rough-surfaced sheet filter material folded back upon its end, forming a flat, single pocket envelope with a folded edge as part of its periphery, two relatively rigid impervious plates of sheet material crimped together tightly to clamp the remaining periphery of said envelope together and to further form a manifold along said folded edge, said plates forming a flat casing, knobs on one of said plates, at least one of said knobs being backed up by the envelope material and the other of said plates to prevent inward collapsing of said flat casing, each of said plates having undulating corrugations, a part of the spaced portions of the hollow formation of the corrugations being in contact with said envelope, with the remaining portions of the hollow formation having spaced outwardly raised portions defining flow passages extending transverse to said corrugations, wherein those portions of the hollow formation that contact said envelope, and the spaced outwardly raised portions are alternately arranged, integrally formed spaced dimples on said sheet filter material to prevent substantial contact of the facing interior surfaces of said envelope material and to maintain said envelope in an open position, inlet means extending through one of said plates to the interior of said envelope and an outlet leading from said manifold, said outlet and manifold being formed from one of said plates, and said manifold tapering and progressively enlarging toward said outlet.

References Cited

UNITED STATES PATENTS

| 2,502,545 | 4/1950 | Wellborn | 210—487 X |
| 3,168,468 | 2/1965 | Jagdmann | 210—445 X |
| 3,295,297 | 1/1967 | Collins | 210—445 X |
| 3,371,793 | 3/1968 | Fowler | 210—445 |

FOREIGN PATENTS

| 177,423 | 7/1953 | Austria. |

REUBEN FRIEDMAN, Primary Examiner

T. A. GRANGER, Assistant Examiner